US009142246B1

(12) United States Patent  
Trantham et al.

(10) Patent No.: US 9,142,246 B1  
(45) Date of Patent: Sep. 22, 2015

(54) APPARATUS AND METHODS TO REDUCE HARD DISK DRIVE MANUFACTURING TEST TIME

(71) Applicant: Seagate Technology LLC, Cupertino, CA (US)

(72) Inventors: Jon Trantham, Chanhassen, MN (US); Christopher Thomas Cole, Bloomington, MN (US); Raye A Sosseh, Minneapolis, MN (US); Kenneth Haapala, Plymouth, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/511,771

(22) Filed: Oct. 10, 2014

(51) Int. Cl.
G11B 5/455 (2006.01)
G11B 19/04 (2006.01)
G11B 5/127 (2006.01)

(52) U.S. Cl.
CPC .............. G11B 19/048 (2013.01); G11B 5/127 (2013.01)

(58) Field of Classification Search
None
See application file for complete search history.

(56) References Cited

U.S. PATENT DOCUMENTS

| 4,270,154 | A |   | 5/1981  | Crawford |
| 4,423,448 | A |   | 12/1983 | Schaefer et al. |
| 4,544,972 | A |   | 10/1985 | Kogure et al. |
| 4,851,939 | A |   | 7/1989  | Seo |
| 5,050,169 | A | * | 9/1991  | Monett .......................... 714/719 |
| 5,218,496 | A |   | 6/1993  | Kaczeus et al. |
| 5,223,993 | A |   | 6/1993  | Squires et al. |
| 5,285,436 | A | * | 2/1994  | Moribe ....................... 369/47.14 |
| 5,293,282 | A |   | 3/1994  | Squires et al. |
| 5,297,024 | A | * | 3/1994  | Carobolante .................... 360/67 |
| 5,341,351 | A |   | 8/1994  | Ng et al. |
| 5,343,345 | A |   | 8/1994  | Gilovich |
| 5,343,347 | A |   | 8/1994  | Gilovich |
| 5,355,486 | A |   | 10/1994 | Cornaby |
| 5,471,733 | A |   | 12/1995 | Bernett |
| 5,477,401 | A |   | 12/1995 | Squires et al. |
| 5,523,901 | A |   | 6/1996  | Anderson |
| 5,761,007 | A |   | 6/1998  | Price |
| 5,774,291 | A | * | 6/1998  | Contreras et al. ............... 360/67 |

(Continued)

FOREIGN PATENT DOCUMENTS

| EP | 0977181   |   | 2/2000  |                |
| GB | 757684 A  | * | 9/1956  | ............... G06K 1/12 |

(Continued)

OTHER PUBLICATIONS

File History for U.S. Appl. No. 14/511,779 retrieved from the U.S. Patent and Trademark Office Pair System on Apr. 9, 2015, 94 pages.

Primary Examiner — Peter Vincent Agustin  
(74) Attorney, Agent, or Firm — Hollingsworth Davis, LLC

(57) ABSTRACT

An apparatus includes a plurality of magnetic read/write heads, a system controller and a switching network. Each of the magnetic read/write heads includes a read sensor element configured to perform a read operation and a write element configured to perform a write operation. The switching network is coupled between the plurality of magnetic read/write heads and the controller. Further, the switching network is configured to substantially simultaneously select elements from at least two of the plurality of magnetic read/write heads in response to a command from the controller such that the operations of the selected elements are performed substantially simultaneously to establish a manufacturing parameter of a disk drive.

24 Claims, 7 Drawing Sheets

(56) References Cited

U.S. PATENT DOCUMENTS

| | | |
|---|---|---|
| 5,805,386 A | 9/1998 | Faris |
| 5,901,010 A | 5/1999 | Glover et al. |
| 5,983,485 A | 11/1999 | Misso |
| 5,991,124 A | 11/1999 | Forbord |
| 6,005,743 A | 12/1999 | Price |
| 6,057,990 A | 5/2000 | Gilovich |
| 6,081,399 A | 6/2000 | Lee |
| 6,121,742 A | 9/2000 | Misso |
| 6,160,676 A | 12/2000 | Takaishi |
| 6,344,938 B1 | 2/2002 | Smith |
| 6,384,998 B1 | 5/2002 | Price |
| 6,437,937 B1 | 8/2002 | Guo et al. |
| 6,449,130 B1 | 9/2002 | Koyama |
| 6,490,138 B1 | 12/2002 | Prater |
| 6,493,172 B1 | 12/2002 | Morris |
| 6,519,109 B1 | 2/2003 | Price |
| 6,542,326 B1 * | 4/2003 | Ell et al. .............. 360/78.05 |
| 6,560,075 B2 | 5/2003 | Price |
| 6,563,657 B1 | 5/2003 | Serrano |
| 6,603,640 B1 | 8/2003 | Prater |
| 6,678,120 B2 | 1/2004 | Money |
| 6,690,549 B1 | 2/2004 | Aikawa |
| 6,693,760 B1 | 2/2004 | Krounbi et al. |
| 6,735,032 B2 | 5/2004 | Dunn |
| 6,768,610 B1 | 7/2004 | Morris et al. |
| 6,819,513 B2 | 11/2004 | Chainer |
| 6,847,504 B1 | 1/2005 | Bennett |
| 6,885,513 B1 * | 4/2005 | Baker .................... 360/17 |
| 6,914,746 B1 | 7/2005 | Meyer |
| 6,952,322 B1 | 10/2005 | Codilian et al. |
| 7,012,777 B1 * | 3/2006 | Hirano et al. ............. 360/77.03 |
| 7,031,115 B1 | 4/2006 | Gilovich |
| 7,102,842 B1 | 9/2006 | Howard |
| 7,133,233 B1 * | 11/2006 | Ray et al. .................. 360/67 |
| 7,146,623 B2 | 12/2006 | Kuwajima |
| 7,199,981 B2 | 4/2007 | Zabtcioglu |
| 7,315,429 B2 | 1/2008 | van Zyl |
| 7,385,781 B1 | 6/2008 | Craig |
| 7,469,463 B2 | 12/2008 | Prater |
| 7,492,542 B2 | 2/2009 | van Zyl |
| 7,710,683 B2 | 5/2010 | Craig |
| 7,760,463 B2 | 7/2010 | Ward |
| 8,028,311 B2 | 9/2011 | Gilovich |
| 8,693,126 B2 | 4/2014 | Buckholdt |
| 2002/0039259 A1 | 4/2002 | Koyama et al. |
| 2012/0206830 A1 * | 8/2012 | Gao et al. .................. 360/61 |
| 2012/0250177 A1 | 10/2012 | Somanache et al. |

FOREIGN PATENT DOCUMENTS

| | | | |
|---|---|---|---|
| JP | 52145017 A * | 12/1977 | G11B 5/02 |
| JP | 59218677 A * | 12/1984 | G11B 21/10 |
| JP | 63306567 A * | 12/1988 | G11B 20/10 |
| JP | 04011302 A * | 1/1992 | G11B 5/09 |
| JP | 5257613 | 10/1993 | |
| JP | 07169185 A * | 7/1995 | G11B 20/10 |
| JP | 10172252 | 6/1998 | |
| KR | 20040451 | 6/2004 | |
| WO | WO2012064226 | 5/2012 | |

* cited by examiner

APPARATUS AND METHODS TO REDUCE HARD DISK DRIVE MANUFACTURING TEST TIME

SUMMARY

An apparatus of the present disclosure includes a plurality of magnetic read/write heads, a system controller and a switching network. Each of the magnetic read/write heads includes a read sensor element configured to perform a read operation and a write element configured to perform a write operation. The switching network is coupled between the plurality of magnetic read/write heads and the controller. Further, the switching network is configured to substantially simultaneously select elements from at least two of the plurality of magnetic read/write heads in response to a command from the controller such that the operations of the selected elements are performed substantially simultaneously to establish a manufacturing parameter of a disk drive.

A method of the present disclosure includes performing a manufacturing test on a disk drive having a plurality of magnetic read/write heads. The performance of the manufacturing tests generally includes substantially simultaneously utilizing at least two of the plurality of read/write heads of the disk drive to establish a manufacturing parameter of the disk drive.

An apparatus of the present disclosure includes a disk drive and a host. The disk drive includes a plurality of magnetic read/write heads, a controller system and a switching network. Each of the magnetic read/write heads includes at least one read sensor element that produces an output in response to the magnetization of a storage media and at least one write element that produces an output suitable for magnetic recording to the storage media. The controller system includes a multi-head controller and a standard controller. The switching network is configured to substantially simultaneously select elements from at least two of the plurality of magnetic read/write heads in response to a command from the controller system. The switching network is additionally configured to substantially simultaneously connect the selected elements to the controller system where upon a manufacturing parameter of the disk drive is recorded. The host is communicatively coupled to the controller system and is configured to receive the manufacturing parameter from the multi-head controller and download the manufacturing parameter to the standard controller.

A method of the present disclosure includes installing a multi-head controller in a disk drive, performing a manufacturing test on the disk drive and recording the results of the manufacturing test on the multi-head controller, transferring the results of the manufacturing test from the multi-head controller to a host, installing a standard controller, and downloading the results of the manufacturing test from the host to the standard controller.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 5(*b*) is an example embodiment of the electrical architecture of a disk drive that may be used to implement a dual-head drive control system.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
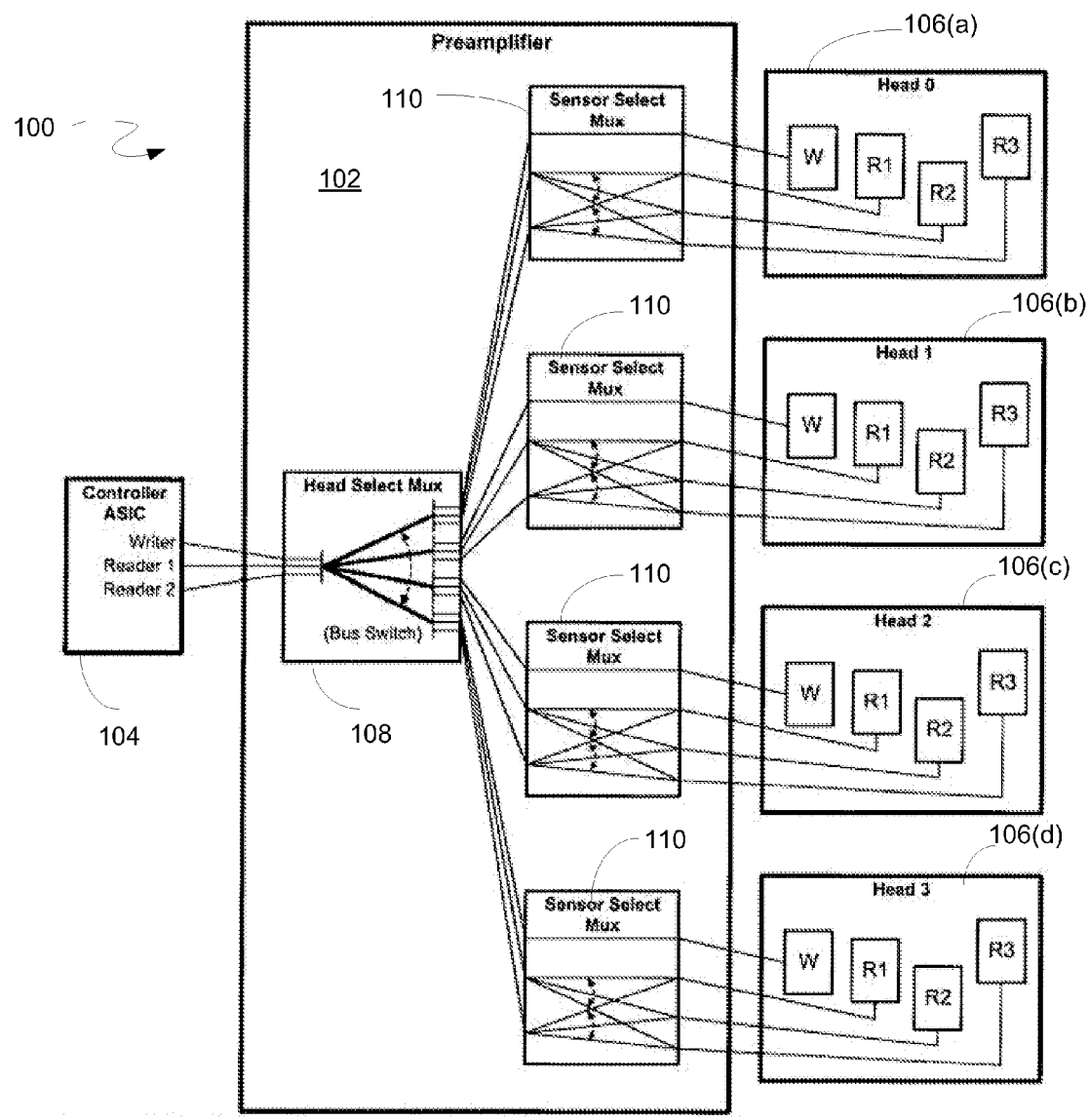
FIG. 1 is a multi-sensor magnetic recording (MSMR) preamplifier switching diagram of a disk drive that may be modified to an example embodiment as disclosed herein.

The amount of time required to manufacture a hard disk drive has grown steadily over the years. A key factor of this increase relates to the time required to write and read all the data on the drive. Although the sequential data rate of drives has improved generation to generation, it has not kept pace with the areal density growth rate of the drives. It is estimated that the amount of time required to manufacture a disk drive has increased six fold over the last ten years. The increase in manufacturing time is detrimental to the both the drive manufacturer and consumer in that it increases manufacturing costs, increases the amount of material that must be in a work-in-progress state, and reduces the ability of the manufacturer to quickly react to changes in marketplace supply and demand.

Certain disk drive manufacturing steps are especially costly in terms of time. An example of a time-intensive manufacturing step includes coherent run-out characterization (CHROME) wherein the servo positioning of all or many tracks on a surface are characterized for coherent repeatable run-out. This characterization is then parameterized and stored non-volatilely for mitigation. Another example includes adaptive fly-height adjustment wherein the recording head is positioned at various radii across the disk and the power-to-contact is measured. The measured power is later used to adjust the fly-height of the head, for example, by adjusting the applied heater power to the recording head during read and write operations.

Another example of a time-intensive disk drive manufacturing step includes the thermal asperity (TA) scan wherein the recording head scans all tracks in the drive for thermal asperities; detected thermal asperities are then avoided when laying out user sectors. Repeatable run-out (RRO) cancellation is still another example wherein all (or most) tracks in the drive are scanned for repeatable run-out. The RRO data is then stored non-volatilely, for example, by writing data to a field within each servo wedge on every track, and used for compensation when reading and writing. Defect scan, format and security format are also time-intensive disk drive manufacturing steps. The defect scan comprises a test pattern(s) being written to the media and then read-back to locate any defects on the disk; defective sectors are not used for storing data. Format includes writing a pattern to all sectors containing user data (optionally, the sectors are read back to confirm the data were stored properly). Security format is similar to format but with encryption enabled; the sectors are written with encryption turned on typically after a drive has been personalized for its final customer.

The present disclosure illustrates devices, systems and methods that may be used to reduce the time of manufacturing disk drives through the simultaneous operation of multiple heads, which can also be described as parallelism. Recent advancements in hard drive technology have provided for multi-sensor magnetic recording (MSMR), also known as two-dimensional magnetic recording (TDMR), where disk drive recording heads are provided with more than one read sensor element which may improve the areal density of the hard drive and/or the performance of the hard drive, for example, by reading multiple tracks simultaneously. In various example configurations, a single disk drive recording head incorporating two or three read sensor elements is possible.

FIG. 1 illustrates a simplified example of a head and disk assembly (HDA) configuration of a disk drive 100 wherein a preamplifier 102 interfaces with a controller 104 to select one of four heads 106(a)-106(d), with each head incorporating a write element (W) and three read sensor elements (R1, R2 and R3). The preamplifier 102 provides the multiplexing (MUX) switching network that enables the desired read sensor element(s) to be coupled to the desired read channel input(s) (Reader 1 and Reader 2) on the controller 104. As shown, a head select MUX 108 within the preamplifier 102 provides a bus switch enabling access to only one of the four heads 106(a)-106(d) at a time. Sensor select MUXs 110 of the preamplifier 102 provide for simultaneous selection of the write element (W) and two of the three read sensor elements (R1, R2, R3). Note that in this preamplifier 102 configuration of the disk drive 100, it is possible to simultaneously select and attach various read sensor elements (R1, R2, R3) within a single recording head, e.g., 106(a) to the controller 104 but it is not possible to simultaneously mix and select a read sensor from one head along with a read sensor from a different head. It is also not possible to mix the read sensors from one head with the writer element from a different head.

Figure 2:
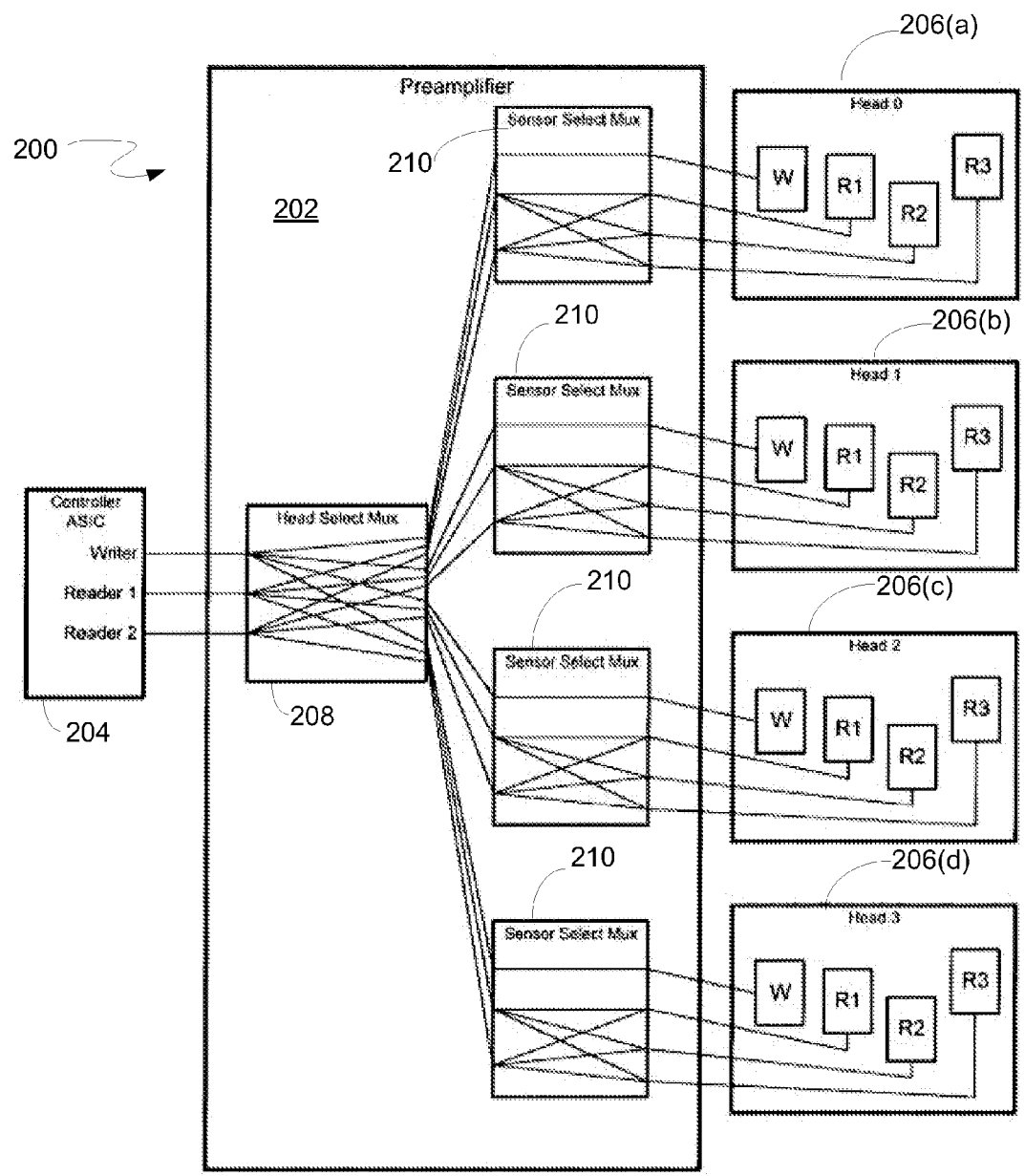
FIG. 2 is an example embodiment of a preamplifier switching diagram of a disk drive providing arbitrary read sensor and write element selection capability.

To achieve parallel operation, and thus reduced manufacturing test time of a hard disk drive, the HDA configuration of FIG. 1 may be altered to the example embodiment of disk drive 200 provided in FIG. 2. In this embodiment, a preamplifier 202 interfaces with a controller 204 to select more than one of the recording heads 206(a)-206(d). As in FIG. 1, each of the recording heads 206(a)-206(d) includes a write element (W) and three read sensor elements (R1, R2, R3) while controller 204 includes a single write channel and two reader channels (Reader 1, Reader 2). However, in this configuration the head select MUX 208 within preamplifier 202 enables substantially simultaneous selection of up to three of the recording heads 206(a)-206(d) while the sensor select MUXs 210 of the preamplifier 202 provide for substantially simultaneous selection of the write element (W) and two of the three read sensor elements (R1, R2, R3) within a single recording head, e.g., 206(a). The configuration of FIG. 2 allows total flexibility enabling the mixing of read sensor elements from different heads and/or mixing a write element with read sensor elements from different heads. It should be noted that if disparate read sensor elements on different heads are used simultaneously, the preamplifier may be modified to support applying reader biasing to the read sensor elements on different heads. Additionally, if other circuitry in the preamplifier is required for the proper operation of a recording head (e.g. if head heaters, contact detection sensors, HAMR laser circuitry, photodiodes, etc. are utilized), corresponding additional circuitry must be added for operation of these systems in parallel. Further, updates to power routing and bias circuitry controls may be implemented.

Figure 3:
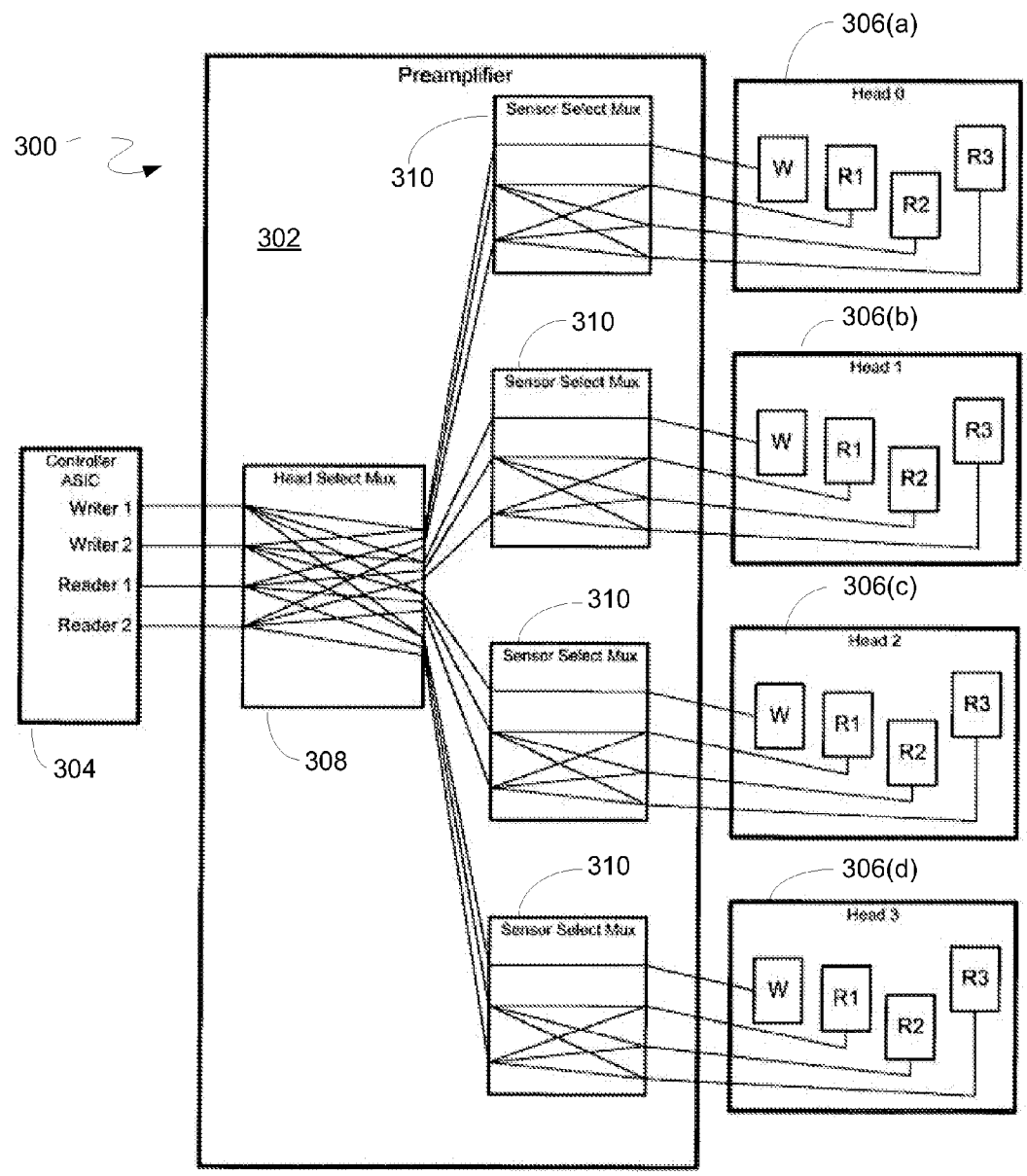
FIG. 3 is an example embodiment of a preamplifier switching diagram of a disk drive providing parallel dual-writer capability.

The embodiment of FIG. 2 can be alternatively modified to provide reduction in manufacturing test time of a disk drive by modifying the HDA configuration to incorporate an additional write channel into the controller, see FIG. 3. As illustrated, the disk drive 300 of FIG. 3 includes a preamplifier 302 to interface between the controller 304 and four heads 306(a)-306(d). The controller 304 includes two write channels (Writer 1, Writer 2) as well as two read channels (Reader 1, Reader 2) while each of the heads 306(a)-306(d) includes a write element (W) and three read sensor elements (R1, R2, R3). A head select MUX 308 provides substantially simultaneous selection for up to four of the four heads 306(a)-306(d) supporting substantially simultaneous writing on two heads and reading on two heads. Each of sensor select MUXs 310 of the preamplifier 302 provides for substantially simultaneous selection of the write element (W) and two of the three read sensor elements (R1, R2, R3) within a single recording head, e.g., 306(a).

Figure 4:
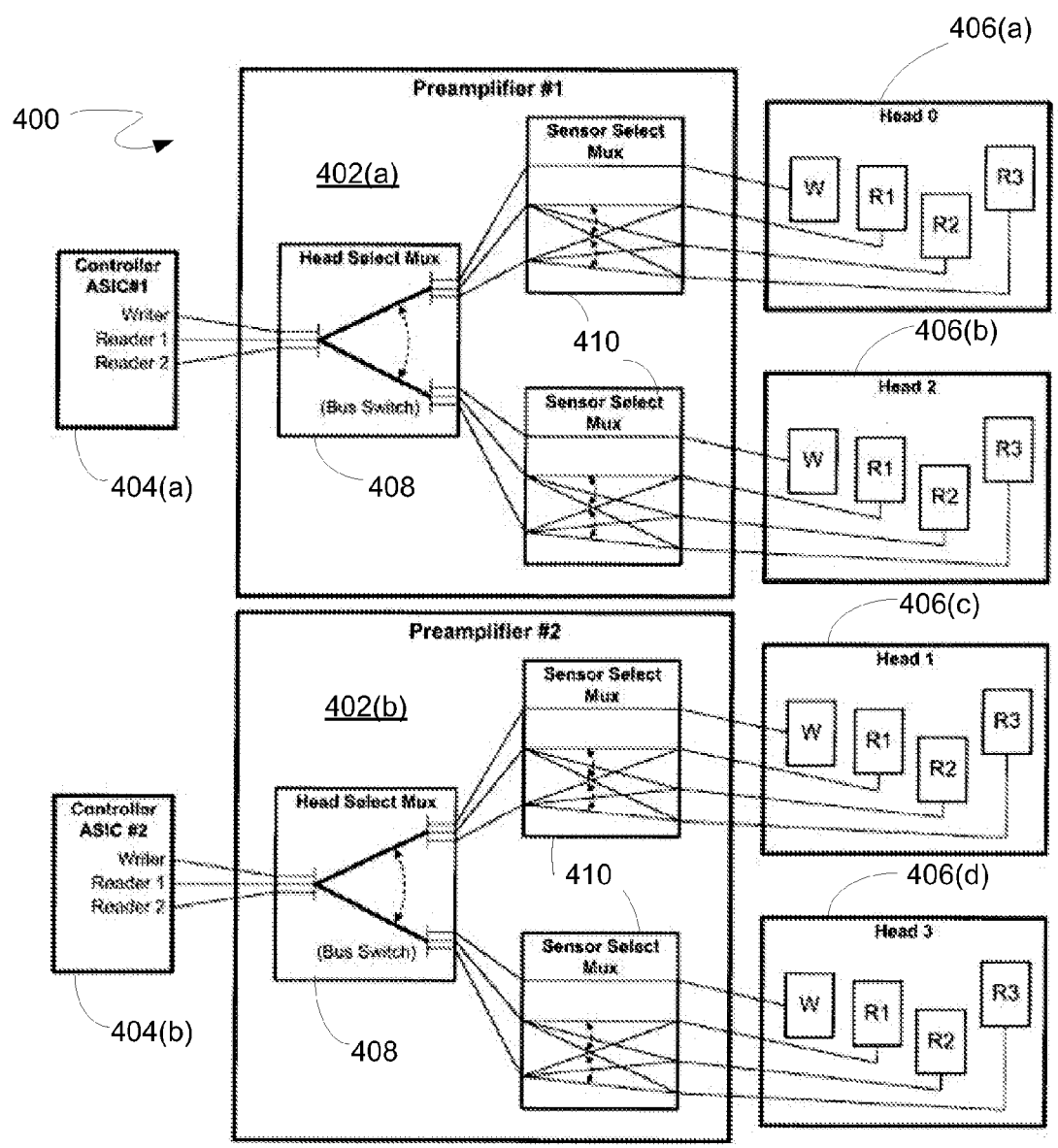
FIG. 4 is an example embodiment of a dual-MSMR, dual-preamplifier switching diagram of a disk drive providing various parallelization capabilities.

An alternative disk drive embodiment configured with the goal of reducing manufacturing test time of the drive is provided in the HDA configuration of FIG. 4. The disk drive 400 of FIG. 4 illustrates that is not necessary to alter the preamplifier to support dual-headed operation. Rather, the disk drive 400 provides for a first preamplifier 402(a) and a second preamplifier 402(b). The first preamplifier 402(a) is coupled between a first controller 404(a) and paired heads 406(a) and 406(c), e.g., even number heads, while the second preamplifier 402(b) is coupled between a second controller 404(b) and paired heads 406(b) and 406(d), e.g., odd number heads. Each of heads 406(a)-406(d) includes a write element W and up to three read sensor elements (R1, R2, R3). Each of the preamplifiers 402(a) and 402(b) includes a head select MUX 408 incorporating a bus switch for selection between one of the two paired heads. Each of the preamplifiers 402(a) and 402(b) also includes sensor select MUXs 410 providing for substantially simultaneous selection of the write element (W) and up to two of the read sensor elements (R1, R2, R3). As such, the disk drive 400 supports multiple parallel writers. However, the cost, space and routing complexity involved in implementing such a dual-preamplifier configuration may be of concern.

The above-noted embodiments utilize an approach of altering the HDA design to support simultaneous operation of multiple recording heads and, thereby, reduce manufacturing test time of a disk drive. An alternate approach to reducing manufacturing test time includes altering the drive controller system of a disk drive to support substantially simultaneous operation of multiple recording heads. This approach can be implemented via a temporary or permanent modification.

A temporary modification may include substituting a multi-head controller, e.g. a printed circuit board assembly (PCBA) that is specifically designed for manufacturing testing for the standard PCBA of the disk drive whereby a standard PCBA can then be installed subsequent to the performance of lengthy manufacturing steps/tests. The temporary approach may be desirable in that the manufacturing PCBA can be repeatedly removed and reused in new disk drives subject to testing and, as such, the extra hardware and power consumption associated with the manufacturing PCBA are limited strictly to a manufacturing test situation. A permanent modification includes modifying the hardware on the standard PCBA to contain the functionality required for simultaneous operation and shipping the hardware with the drive. In either the temporary or permanent approach, the capabilities of the disk drive are extended for substantially simultaneous operation.

Figure 5A:
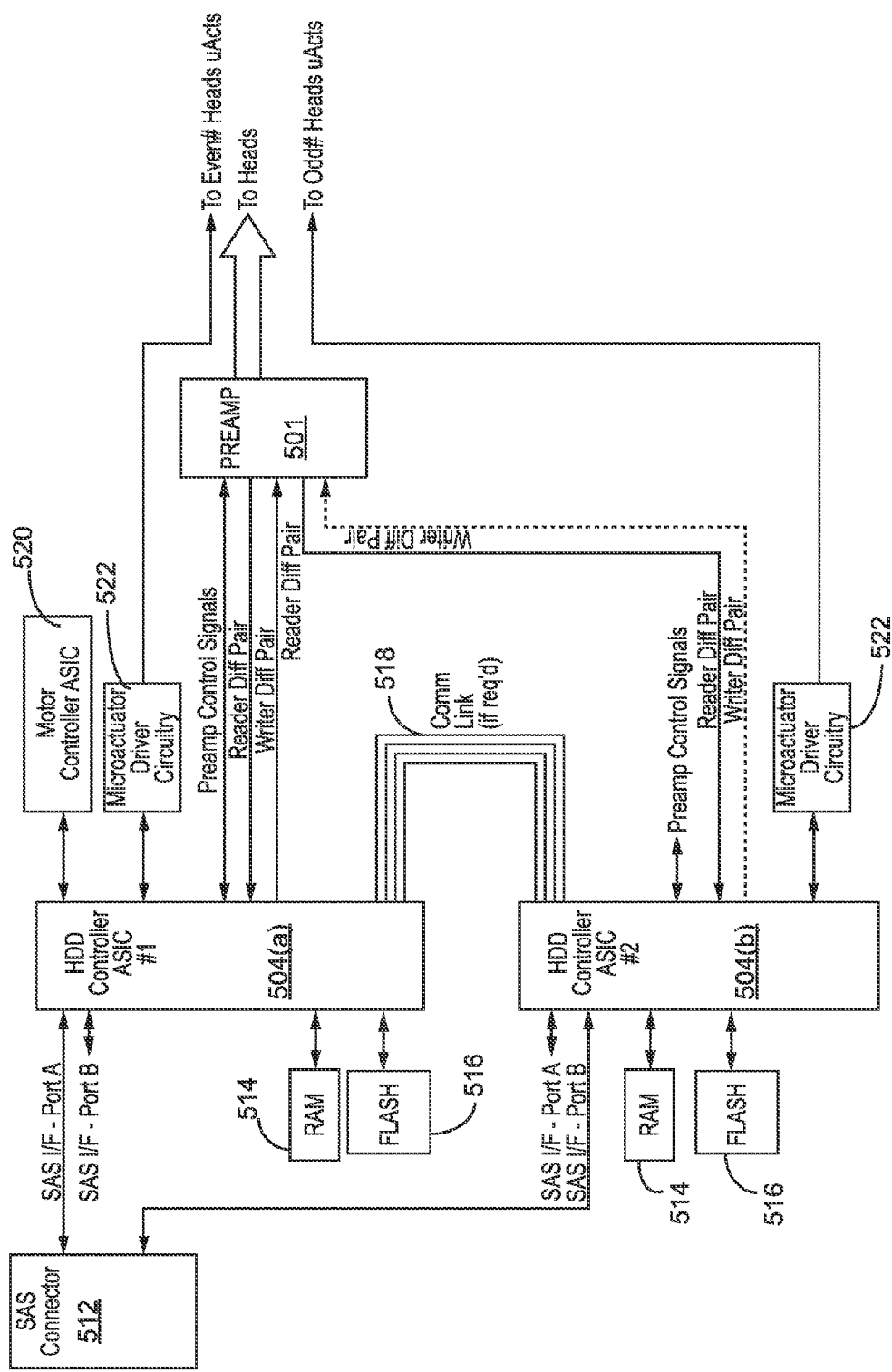
FIG. 5(*a*) is an example embodiment of the electrical architecture of a disk drive that may be used to implement a dual-head drive control system.
Figure 5B:
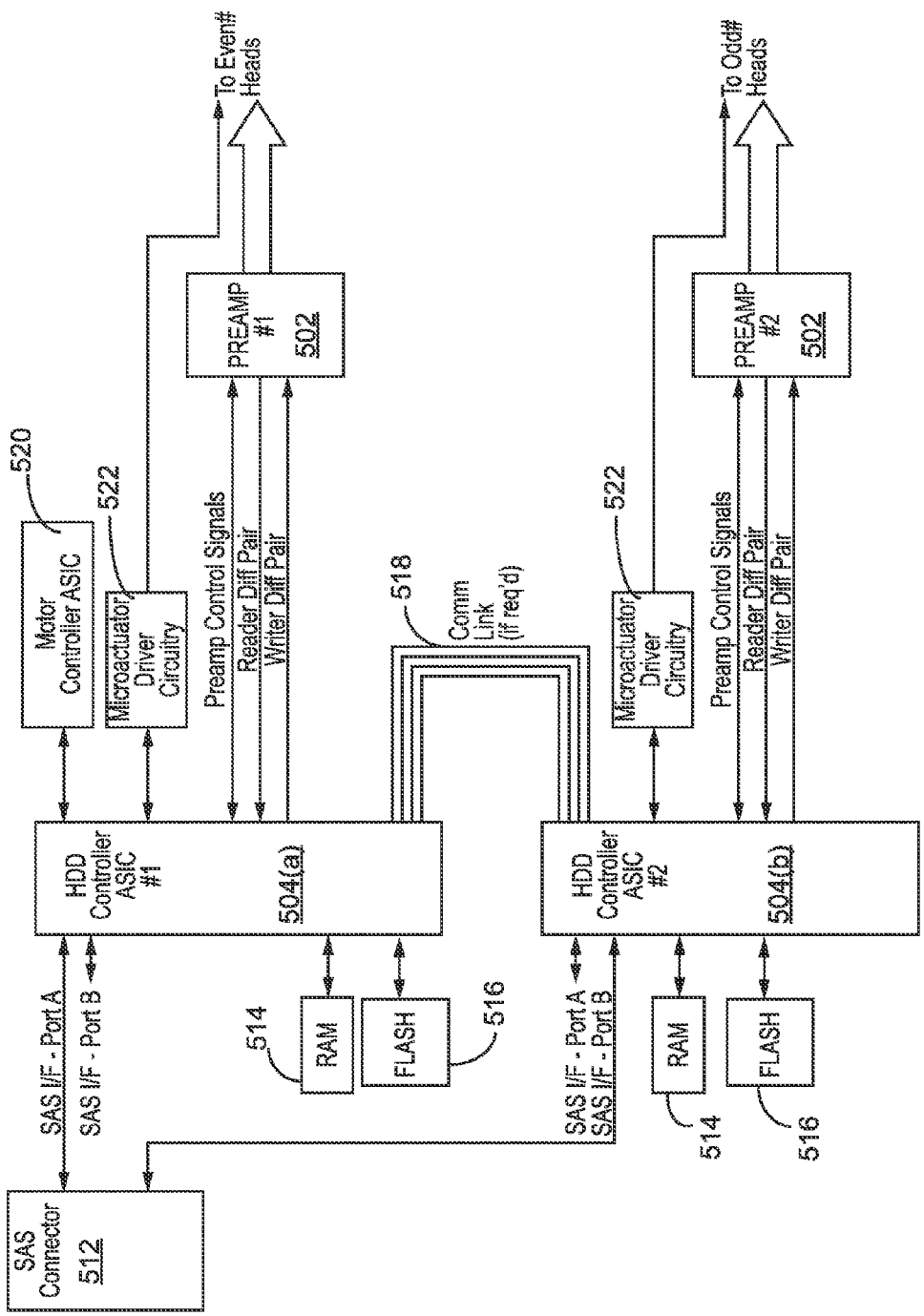

Examples of capability extension by modifying the drive controller system of a disk drive to reduce manufacturing test time are illustrated in FIGS. 5(a) and 5(b). FIG. 5(a) depicts the electrical architecture of a drive controller system 500 that has been modified to replace a single standard controller with two standard controllers 504(a) and 504(b) and to replace a standard preamplifier with a multi-sensor magnetic recording (MSMR) preamplifier (501 and 102) or alternately with an enhanced preamplifier (e.g. as in FIGS. 2-4). Each controller 504(a) and 504(b) may be connected to a host (not shown) via an appropriate connector 512. Further, each controller 504(a) and 504(b) may be provided with random access memory (RAM) 514 and flash memory 516. The controllers 504(a) and 504(b) are connected via a communication link 518 enabling a single motor controller 520, e.g., a voice coil motor (VCM), to control the coarse positioning of all heads (not shown), while separate micro actuator drive circuitry 522, e.g., piezoelectric motors, are provided to control the even numbered heads through controller 504(a) and the odd numbered heads through controller 504(b). The configuration of FIG. 5(a) allows for parallel, dual-operation, resulting in substantially simultaneous read and write operations. FIG. 5(b) illustrates a similar configuration with the MSMR preamplifier 501 of FIG. 5(a) replaced with a pair of standard preamplifiers 502, one per each controller 504(a) and 504(b). Another example of driver controller system modification for simultaneous operation of multiple recording heads includes modifying a standard controller to further include an added system read channel (SRC), decoder, formatter, buffer manager client, servo controller, and servo processor. Each of the configurations described herein provides the maximum benefit of time reduction by allowing the lengthiest manufacturing tasks to be simultaneously performed on two recording heads.

In the instance of a drive controller system utilizing two controllers, e.g., FIGS. 4, 5(a) and 5(b), to use multiple heads to substantially simultaneously perform manufacturing tests in order to reduce manufacturing time, it may be necessary to coordinate operations, target track numbers, results, etc. between the two controllers. Such coordination may be achieved in various ways. For example, a host system may communicate with both controllers though a host interface, e.g., SAS interface, while the host system communication is further augmented with additional communication paths, e.g., using a GPIO signal to communicate track switches on sequential operations. Alternatively, an inter-controller, e.g., inter-ASIC, communication bus may be used to facilitate direct access between controllers (e.g., PCIe, APB, etc.). Still another alternative for controller-to-controller communication is to utilize the host interface ports of both controllers to communicate with each other by tying them directly together and also using a serial port to communicate with a tester. Other communication interfaces, (e.g., RS-232, I2C, USB, wireless, etc.) may be used as appropriate.

Figure 6:
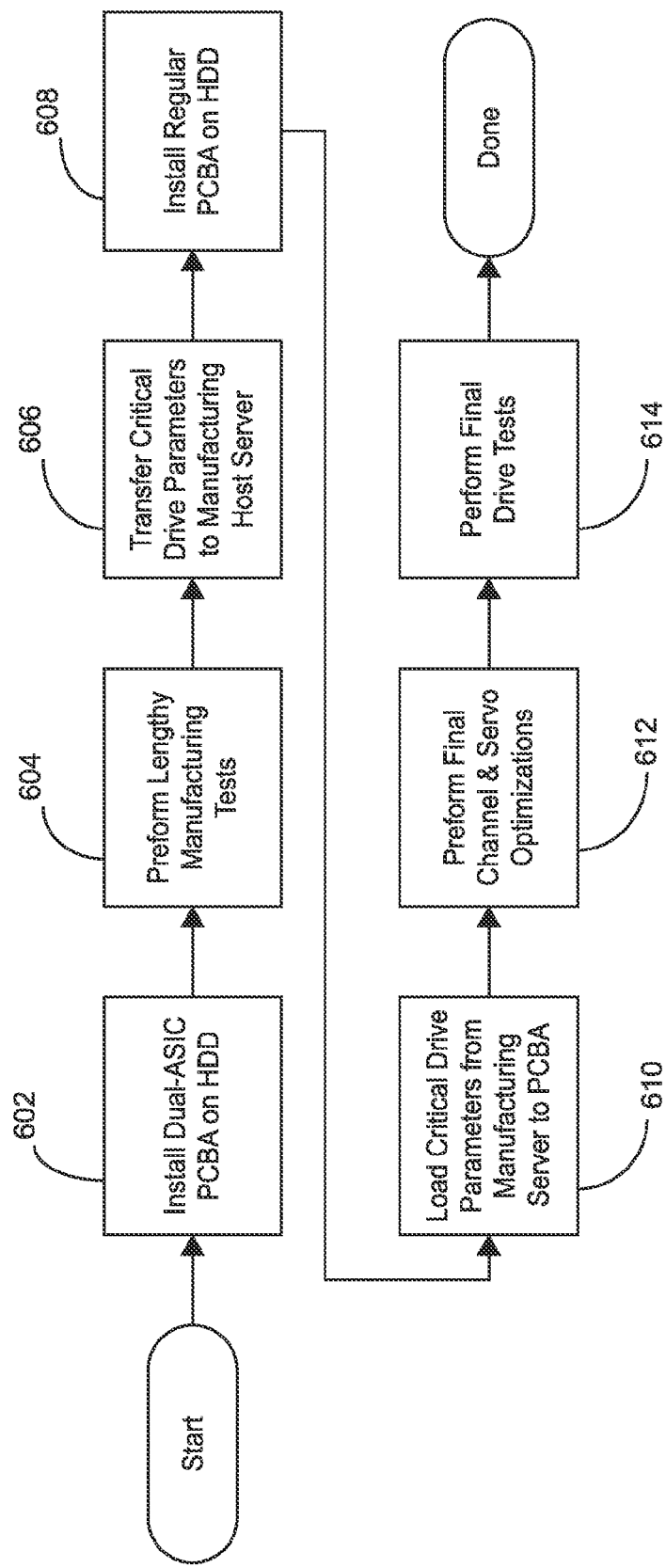
FIG. 6 is flowchart illustrating a procedure for utilizing a dual-head drive control system in the manufacture of a disk drive.

As previously noted, altering a drive controller system to support simultaneous operation of recording heads to reduce manufacturing test time of a disk drive may include a temporary or permanent approach. The flowchart of FIG. 6 illustrates an example implementation of a temporary approach through use of a replaceable test PCBA/test controller. First, a dual controller board, e.g., dual-ASIC PCBA, is installed on the hard disk drive 602. The lengthy, time consuming manufacturing tests of the disk are then performed at increased speed through the substantially simultaneous, parallel operation of multiple (e.g., dual) heads 604. Once the manufacturing tests have been performed, the critical drive parameters obtained during the test may be transferred to the manufacturing host server 606. The standard single controller board, e.g., single-ASIC PCBA, may then be installed in the disk drive 608. The critical drive parameters previously stored on the manufacturing host server may then be loaded onto the single controller board of the disk drive 610. Of course, other methods of communicating the critical parameters are possible, such as direct transfers between PCBAs. Alternately, it is possible to avoid inter-PCBA communication altogether, for example by storing critical parameters on the storage media. Once controllers have been swapped, final channel and servo optimizations of the disk drive may then be performed 612, as well as final drive tests 614, to complete manufacture of the disk drive.

While the above has described altering hardware, e.g., the preamplifier and drive controller system, to implement simultaneous operation of multiple recording heads to reduce the manufacturing test time of disk drive, it should be noted that the simultaneous operation may also be implemented through software modifications. For example, a second set of servo demodulation logic may be added to the drive controller logic such that the fine positioning of two recording heads may be controlled independently of each other. This allows for parallelization of servo manufacturing tasks with simultaneous servo characterization possible upon multiple media surfaces of the disk drive.

It should also be noted that, while the description above has generally referenced substantially simultaneous parallel operation of two heads, the concepts may be further extended to three, four or all heads operating in parallel.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus comprising:
 a plurality of magnetic read/write heads, wherein each of the magnetic read/write heads includes a plurality of read sensor elements each configured to perform a read operation and a write element configured to perform a write operation;
 a controller; and a switching network coupled between the plurality of magnetic read/write heads and the controller, the switching network configured to substantially simultaneously select elements from at least two of the plurality of magnetic read/write heads in response to a command from the controller, and wherein the operations of the selected elements are performed substantially simultaneously.

2. The apparatus of claim 1, wherein the apparatus is utilized to establish a manufacturing parameter of a disk drive.

3. The apparatus of claim 1, wherein the selected read sensors comprise disparate read sensors from different magnetic read/write heads.

4. The apparatus of claim 1, wherein the controller comprises a multi-head controller that is interchangeable with a standard controller.

5. The apparatus of claim 1, wherein the selected elements comprise a write element from a first magnetic read/write head and a write element from a second magnetic read/write head.

6. The apparatus of claim 1, wherein the switching network comprises a single preamplifier.

7. The apparatus of claim 6, wherein the switching network comprises a tiered switching network that includes a head select network and a sensor select network.

8. The apparatus of claim 1, wherein the switching network comprises a pair of substantially similar preamplifiers.

9. A method comprising:
performing a manufacturing test on a disk drive having a plurality of magnetic read/write heads each comprising a plurality of read sensor elements and a write element, wherein performance of the manufacturing test comprises substantially simultaneously utilizing at least two of the plurality of read/write heads of the disk drive to establish a manufacturing parameter of the disk drive.

10. The method of claim 9, wherein the manufacturing test comprises substantially simultaneously utilizing at least three of the plurality of read/write heads of the disk drive to establish a manufacturing parameter of the disk drive.

11. The method of claim 9, wherein the manufacturing test comprises substantially simultaneously utilizing at least four of the plurality of read/write heads of the disk drive to establish a manufacturing parameter of the disk drive.

12. The method of claim 9, further comprising selecting a magnetic read/write head from which to read or to which to write using a switching network.

13. The method of claim 12, wherein the switching network comprises a tiered switching network that includes a head select network and a sensor select network.

14. The method of claim 12, wherein the switching network comprises a pair of substantially similar preamplifiers.

15. The method of claim 9, wherein the manufacturing test is implemented through use of a multi-head controller that is swappable with a standard controller.

16. A system comprising:
a disk drive, comprising:
a plurality of magnetic read/write heads, wherein each of the magnetic read/write heads includes at least one read sensor element that produces an output in response to the magnetization of a storage media and at least one write element that produces an output suitable for magnetic recording to a storage media; and
a controller system comprising a multi-head controller and a standard controller; and
a switching network configured to substantially simultaneously select elements from at least two of the plurality of magnetic read/write heads in response to a command from the controller system, and configured to substantially simultaneously connect the selected elements to the controller system whereupon a manufacturing parameter of the disk drive is recorded; and
a host communicatively coupled to the controller system and configured to receive the manufacturing parameter from the multi-head controller and download the manufacturing parameter to the standard controller.

17. The system of claim 16, wherein only one of the multi-head controller and standard controller are within the disk drive at a time.

18. The system of claim 16, wherein the multi-head controller and the standard controller are within the disk drive at the same time.

19. The system of claim 16, wherein the selected elements are disparate elements.

20. A method comprising:
installing a multi-head controller in a disk drive;
performing a manufacturing test on the disk drive and recording the results of the manufacturing test on the multi-head controller;
transferring the results of the manufacturing test from the multi-head controller to a host;
installing a standard controller in the disk drive; and
downloading the results of the manufacturing test from the host to the multi-head standard controller.

21. The method of claim 20, wherein installing the standard controller comprises replacing the multi-head controller with the standard controller.

22. The method of claim 20, wherein installing the standard controller comprises co-installing the standard controller with the multi-head controller.

23. The method of claim 20, further comprising performing an additional manufacturing test with the standard controller.

24. The method of claim 20, wherein the manufacturing test is selected from a group consisting of: coherent run-out characterization, adaptive fly-height adjustment, thermal asperity scan, repeatable run-out cancellation, defect scan, format, or security format.

* * * * *